United States Patent [19]

Perego

[11] Patent Number: 4,736,648
[45] Date of Patent: Apr. 12, 1988

[54] SPEED CONTROL FOR VEHICLES FOR CHILDREN

[75] Inventor: Gianluca Perego, Arcore, Italy
[73] Assignee: Peg Perego Pines S.p.A., Italy
[21] Appl. No.: 27,157
[22] Filed: Mar. 17, 1987
[30] Foreign Application Priority Data

Mar. 21, 1986 [IT] Italy ................................ 21314/86[U]

[51] Int. Cl.⁴ ........................... G05G 1/14; B60K 1/00
[52] U.S. Cl. .................................... 74/474; 74/478.5;
74/480 R; 74/512; 74/872; 180/65.1; 318/109;
318/139
[58] Field of Search ................. 74/474, 478.5, 480 R,
74/512, 872, 873; 192/0.098; 180/65.1;
318/109, 139

[56] References Cited

U.S. PATENT DOCUMENTS

| 846,376 | 3/1907 | Adams ........................... 74/480 R |
| 3,135,234 | 6/1964 | Turnidge ........................ 192/0.098 |
| 4,077,283 | 3/1978 | Hammond ................... 74/480 R X |
| 4,639,646 | 1/1987 | Harris et al. ....................... 318/139 |

FOREIGN PATENT DOCUMENTS

| 52-53330 | 4/1977 | Japan ............................... 74/480 R |
| 630496 | 10/1949 | United Kingdom .............. 180/65.1 |

Primary Examiner—Allan D. Herrmann
Attorney, Agent, or Firm—McGlew and Tuttle

[57] ABSTRACT

A speed control for children's vehicles driven by a battery powered electric motor comprises, in combination: a first lever that can be moved between a first position controlling low speed power supply and a second position corresponding to a high speed, and a second lever that can be moved between a first and second position controlling forward and reverse vehicle movement respectively. Between the said two levers provision is made for rigid reciprocal connection means acting unidirectionally between the said first and second levers so as to take the first lever to its first position when the second lever is taken to its second position.

2 Claims, 2 Drawing Sheets

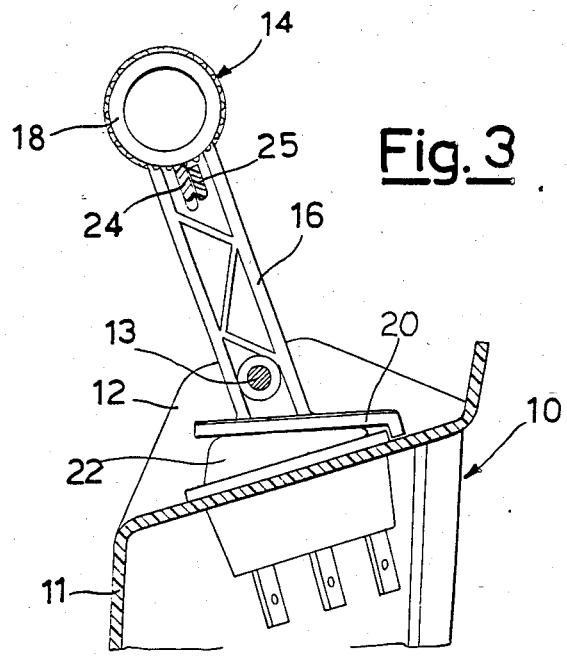
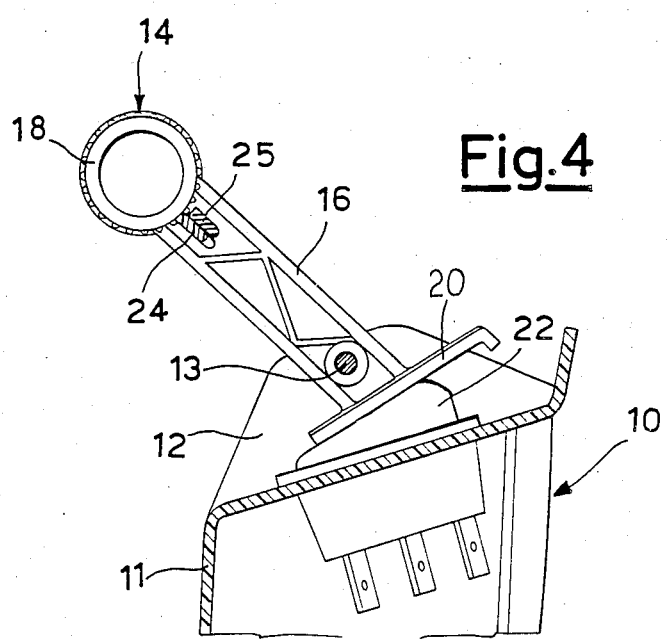

SPEED CONTROL FOR VEHICLES FOR CHILDREN

The present invention relates to an improved speed control for children's vehicles driven by a battery powered electric motor.

Children's vehicles of the said type are known which have a speed control comprising a first and second speed lever applicable respectively to a gearbox proper—for example first and second gear—and to reverse gear.

Speed controls of such kind suffer from the disadvantage that the reverse gear can be engaged by the children while the vehicle is at top speed.

As well as damaging the motor, this causes sudden decelerations and accelerations in reverse gear which can result even in serious falls.

The object of the present invention is to obviate the aforesaid disadvantages by embodying a speed control for children's vehicles in which, when reverse gear is engaged, the gearbox goes automatically into the lower gear.

To achieve this object the invention embodies a gear control for children's vehicles driven by a battery powered electric motor, of the type comprising, in combination: a first lever that can be moved between a first position controlling slow speed power supply and a second position corresponding to a high speed, and a second lever than can be moved between a first and a second position controlling forward and reverse vehicle movement respectively, wherein provision is made between the said two levers for rigid reciprocal connecting means acting unidirectionally between the said first and second levers so as to take the first lever into its first position when the second is taken into its second position.

The said connection means preferably consist of a pair of radial tongues projecting respectively from the said two levers.

The structural and functional characteristics of the invention, and its advantages, will become more apparent from an examination of the following description referred to the appended drawings, which show an example of a gear control device embodied according to the innovatory principles of the invention.

In the drawings:

FIG. 3 is a partially sectional particular showing the device in a second operative position; and FIG. 4 is a particular as in FIG. 3, but showing the device in a third, provisional operative position before it returns to the same position as is shown in FIG. 2.

Figure 1:
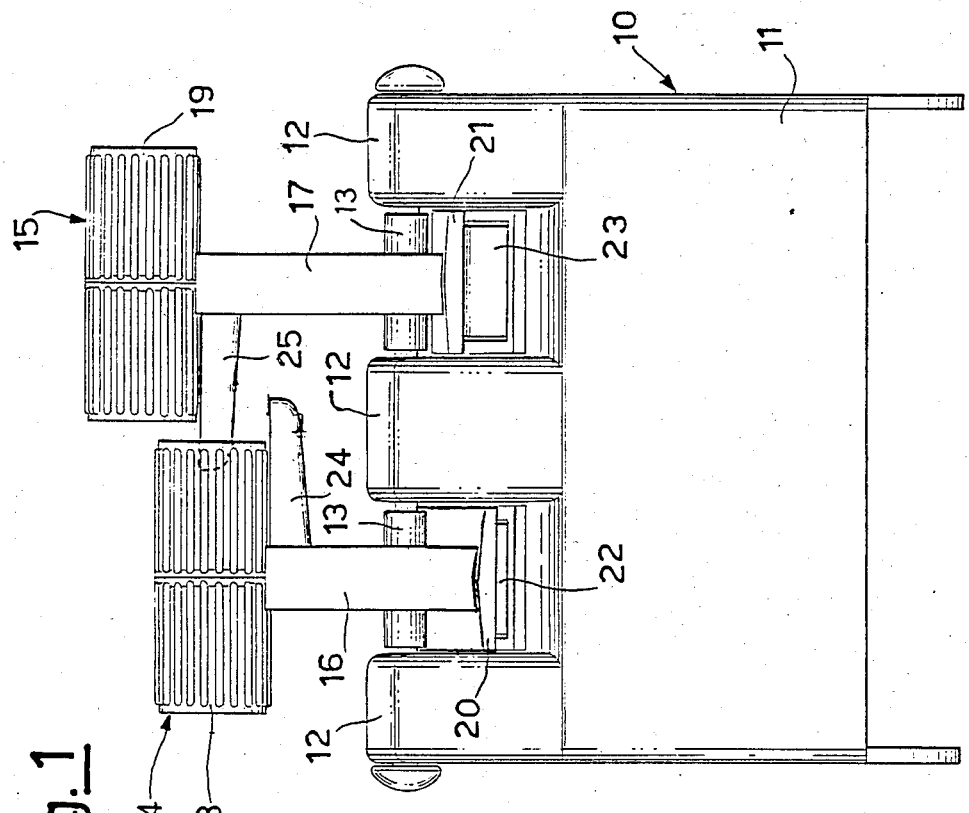
FIG. 1 is a front elevation showing a device embodied in accordance with the invention.
Figure 2:
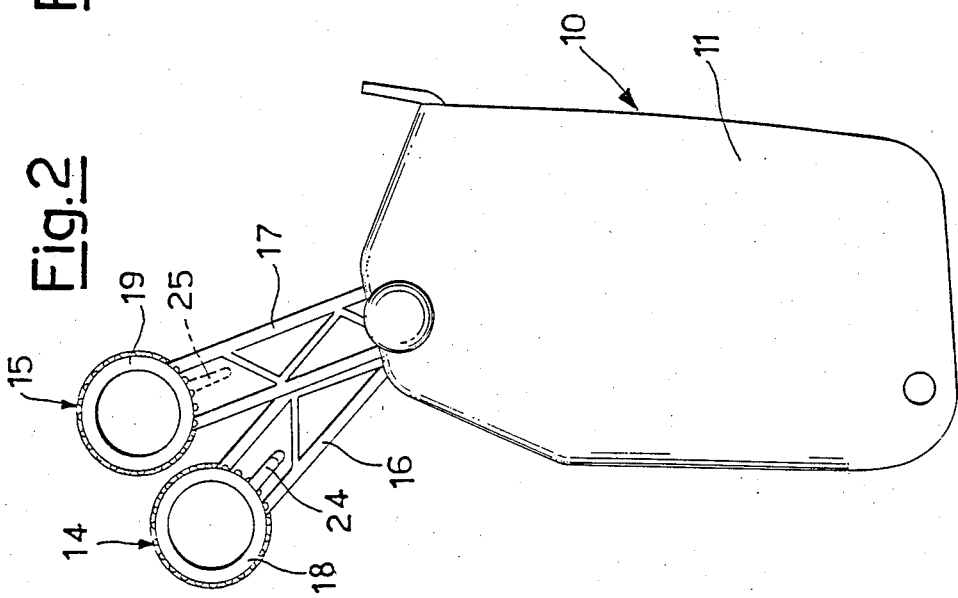
FIG. 2 is a side elevation of the same device as in FIG. 1 in a first operative position.

With reference to the drawings, the speed control device in question is indicated overall by 10 and comprises a box-shaped body 11 defining a plurality of forks 12, 12, 12 (the intermediate one being in common) to which, through a single pivot 13, are pivoted two levers 14, 15. The lever 14 relates to the gearbox of the children's vehicle, whereas the lever 15 serves to change the direction of the vehicle from forward to reverse (FIGS. 1 and 2).

Each of the levers 14, 15 consist of an arm 16, 17 which at one free end has a grip 18, 19 and at the opposite end a foot 20, 21.

The feet 20, 21 cooperate respectively with a change-over switch 22 and with a reversing switch 23 which are part of an electric control circuit which is per se known and therefore not shown in detail.

The change-over switch 22 can be moved between two stable positions, in which the batteries feeding the electric motor of the vehicle are connected in parallel and in series respectively; the parallel connection (FIG. 2) corresponds to the first speed (lower) while the series connection (FIG. 3) coresponds to the second speed (higher). A comparable effect can be obtained by respective connection of disconnection of resistors.

The reversing switch 23 is normally in the stable vehicle forward direction position (FIG. 2) and can be shifted to the instable reverse direction position (FIG. 4), in which the electric motor feed current polarities are inverted.

Characteristically, respective tongues 24, 25 extend radially from the arms 16, 17 of the levers 14, 15; these tongues cooperate with each other in the manner described below.

When the levers 14, 15 are disposed in the position shown in FIG. 1, the vehicle moves forward at a low speed; the gear control lever 14 can be considered as bottom gear.

If it is wished to increase speed, the lever 14 is moved to the position shown in FIG. 3 (second gear) so as to act through the intermediary of its foot 20 on the change-over switch 22 which places the vehicle electric motor feed batteries in series connection. In this condition the tongues 24, 25 are adjacent to each other.

If the driver of the children's vehicle decides to engage reverse gear with the vehicle moving at a relatively high speed, it will be seen that, by moving the lever 15 from the position shown in FIG. 3 to the position shown in FIG. 4, the tongue 25 will act upon the tongue 24, thus causing the lever 14 to shift automatically to the low speed position (bottom gear). This makes it possible to prevent damage to the electric motor and also sudden reverse and forward accelerations of the vehicle, which could cause the child to fall out of the vehicle.

The first and second gear or speed position of the lever 14 can be stable and determined by the same elastic means that determine the positions of the change-over switch 22.

The lever 14, on the other hand, can advantageously always be shifted by the elastic means of the reversing switch 23 into the forward direction position (FIGS. 1-3), as soon as the manual action of the child on the lever 14 has terminated.

I claim:

1. A speed control for children's vehicles driven by a battery powered electric motor of the type comprising, in combination: a first lever that can be moved between a first position controlling low speed power supply and a second position corresponding to a high speed, and a second lever that can be moved between a first and second position controlling forward and reverse vehicle movement respectively, wherein provision is made between the said two levers for rigid reciprocal connection means acting unidirectionally between the said first and second levers so as to take the first lever to its first position when the second lever is taken to its second position.

2. A speed control as described in claim 1, wherein the connection means consist of a pair of radial tongues projecting respectively from the said two levers.

* * * * *